United States Patent [19]

Naimpally

[11] Patent Number: 5,619,337
[45] Date of Patent: Apr. 8, 1997

[54] MPEG TRANSPORT ENCODING/DECODING SYSTEM FOR RECORDING TRANSPORT STREAMS

[75] Inventor: Saiprasad V. Naimpally, Langhorne, Pa.

[73] Assignee: Matsushita Electric Corporation of America, Secaucus, N.J.

[21] Appl. No.: 380,262

[22] Filed: Jan. 27, 1995

[51] Int. Cl.⁶ .............................. H04N 5/76; G11B 5/09; G11B 5/02; G11C 15/18
[52] U.S. Cl. .............................. 386/83; 386/95; 386/124
[58] Field of Search .................................. 360/51, 48, 18, 360/69; 370/94.1, 60, 100.1, 84; 348/7; 358/335, 342

[56] References Cited

U.S. PATENT DOCUMENTS

| | | |
|---|---|---|
| 5,291,486 | 3/1994 | Koyanagi .................... 370/84 |
| 5,294,974 | 3/1994 | Naimpally et al. . | |
| 5,396,497 | 3/1995 | Veltman ................ 370/100.1 |
| 5,414,455 | 5/1995 | Hooper et al. ................ 348/7 |
| 5,455,684 | 10/1995 | Fujinami et al. ........... 358/335 |
| 5,481,543 | 1/1996 | Veltman ................. 370/94.1 |

OTHER PUBLICATIONS

A. Guha et al., "Multichannel Joint Rate Control of VBR MPEG Encoded Video for DBS Applications", *IEEE Transactions on Consumer Electronics*, vol. 40, No. 3, pp. 616–623, Aug. 1994.
MPEG–2 system standard, ISO/IEC HTC1/CS29/WG11 NO721, rev 10, pp. 11–21, Jun. 1994.

*Primary Examiner*—Thai Q. Tran
*Assistant Examiner*—Luanne P. Din
*Attorney, Agent, or Firm*—Ratner & Prestia

[57] ABSTRACT

A system records a single program from a multi-program transport stream that is encoded according to the MPEG-2 standard. The system demultiplexes transport packets from the multi-program transport stream and records the demultiplexed packets on a digital video cassette recorder (DVCR). The system includes circuitry in the encoder which emulates a buffer in the digital recorder that is used to hold the packets to convert the bursty packet data into constant rate data for recording. This emulated buffer controls the overall rate at which packets of the selected program are inserted into the multi-program transport stream by the encoder. As each packet is recorded, a time stamp value, representing when the packet was demultiplexed and a clock count value, representing a number of pulses of a high-frequency system clock signal that occurred during a predetermined number of bytes of the demultiplexed packet are recorded with the demultiplexed packet. These values are used to regenerate timing signals for a single program transport stream when the recorded packet data is replayed from the tape.

9 Claims, 7 Drawing Sheets

FIG. 6

MPEG TRANSPORT ENCODING/DECODING SYSTEM FOR RECORDING TRANSPORT STREAMS

BACKGROUND OF THE INVENTION

The present invention concerns a system for recording programs that have been encoded according to the MPEG standard defined by the moving-pictures expert group and in particular to a system for recording selected MPEG-2 programs from a multi-program transport stream.

The MPEG-2 system standard, ISO/IEC HTC1/CS29/WG11 N0721, rev 10 Jun. 1994, which is hereby incorporated by reference for its teachings on MPEG-2 encoding, defines a method of formatting and transmitting multiple digitally encoded programs, each including a video portion, an audio portion and a data portion. According to this standard, data representing multiple programs may be transmitted as a single time-division multiplexed transport stream.

The basic unit of the transport stream is a transport packet. Each transport packet has a fixed length (i.e. 188 bytes) and includes a header portion and a data portion. The data portions of several transport packets, when combined, form a packetized elementary stream (PES) packet. Each PES packet may represent part of the video information, the audio information or the data which together constitute the program. The transport packets representing PES packets for different programs may be interleaved. Thus, the multiple programs may be sent in a time-division multiplexed format. In addition, the transport stream includes some system packets which do not belong to any program but which are used to associate the transport packets with their respective programs.

Transport streams containing multiple programs are already in use, for example, by the direct broadcast satellite (DBS) systems such as DirecTV Inc., and the United States Satellite Broadcasting system (USSB). In these systems, several programs, each representing, for example, programming that would be sent on a conventional terrestrial broadcast channel, are combined in a single transport stream and transmitted over a transponder channel. The satellite service consists of several transponder channels. At the receiver, a particular transport stream is selected and the transport packets corresponding to a particular program are demultiplexed. These packets are then provided to a decoder to reproduce the program or are decoded to recover an analog video signal which may be recorded on a conventional VCR.

According to the MPEG standard, data is produced at a highly variable data rate but is transmitted to a remote location at a fixed data rate, where it is decoded at a variable rate. In order to convert from variable rate to fixed rate and back to variable rate, both the encoder and decoder include buffer memories which hold the data temporarily.

The rate at which data is provided in each of the programs may be controlled in at least two ways. According to one method, to ensure that the data for any given program will not exceed the capacity of the decoder, the encoder includes circuitry which monitors the effective data rate of each transmitted program. This circuitry implements a model of the decoding process which is called the Transport Stream Target System Decoder (T-STD). This model, which is defined in the above-referenced MPEG-2 system standard at section 2.4.2, defines how quickly the data in the transport stream is processed. If the encoder supplies data during a predetermined interval, at a rate higher than that indicated by the T-STD model, the buffers for holding the data in a receiver may overflow and portions of the program data stream may be lost. If the encoded data is supplied at a rate much lower than the T-STD model, there may not be enough data to keep the decoder in operation, causing gaps in the reproduced program.

If the data rate of the program does not fall within the parameters of the T-STD model for that program, the encoder is controlled to provide data for the program at a lower rate (if the previous rate was too high for the model) or at a higher rate (if the previous rate was too low for the model). In an encoded MPEG-2 transport stream the data rate may be adjusted by providing data from the transport buffer more or less frequently.

In addition to this program-by-program rate controller, statistical rate controllers may be used to further optimize the utilization of the transport channel. An example of this is described in an article by A. Guha et al. entitled "Multi-channel Joint Rate Control of VBR MPEG Encoded Video for DBS Applications" *IEEE Transactions on Consumer Electronics,* Vol. 40, No. 3, August, 1994. This system monitors the amount of data that is being provided by each of the programs and allows a program that needs to send a relatively high volume of data to "borrow" transmission bandwidth from programs which need to send only relatively small amounts of data. This system may be used in conjunction with multiple T-STD models, providing a further control on when data for a particular program is allowed in the program transport stream.

SUMMARY OF THE INVENTION

The present invention is embodied in a system which separates one program from a multi-program transport stream for recording on a digital VCR. The recorded transport stream may be read from the tape and applied to a transport decoder to be processed in the same way as a received transport stream. The system includes circuitry at the source of the transport stream which ensures that the transport packets for at least the one program are placed in the transport stream at an overall rate that does not exceed the rate at which the information may be processed by the recorder. In addition, the system includes circuitry which adds timing information to each transport packet as it is recorded on the tape. As the recorded data is read from the tape, circuitry in the system processes the timing information to generate a digital data stream which approximates the transport stream for the one program.

DETAILED DESCRIPTION

In processing multiple program data streams, it is desirable to be able to record one or more programs in much the same was as a conventional VCR records programs today. If, however, the program were to be fully decoded and recorded in analog format, the VCR would necessarily include a full MPEG-2 decoder. The present invention is embodied in a digital video cassette recorder (DVCR) which can record one or more programs from a multi-program transport stream without completely decoding the programs. Briefly, the DVCR according to the present invention demultiplexes the transport packets for the program or programs from the transport stream and records the packets in transport stream format. On playback, the DVCR reconstructs an MPEG transport stream which contains only the desired program or programs.

To be most effective, the DVCR according to the present invention should meet several criteria. It should be able to record the program transport stream or streams at a rate which ensures that no data is lost and it should be able to reproduce an MPEG-2 transport stream that can be readily processed by a standard MPEG-2 decoder. While the invention is described in terms of an MPEG-2 encoder and decoder, it is contemplated that it may be practiced using multi-program data streams encoded according to other standards, such as MPEG-1.

While the T-STD model is an accurate representation of how one program in the transport stream is processed by a decoder, it may not be an accurate model of how the same program is processed for recording on a digital video cassette recorder (DVCR). An exemplary MPEG encoder according to the present invention includes a decoding model, separate from the T-STD model, for each program that may be recorded, to ensure that the data rate of the program is appropriate for recording on a DVCR. These models may be monitored by the data rate controller of the encoder in the same way as the T-STD models, and/or may be used to override the statistical multiplexing model in order to adjust the data rate of the transport stream for each program which may be recorded.

Figure 1A:
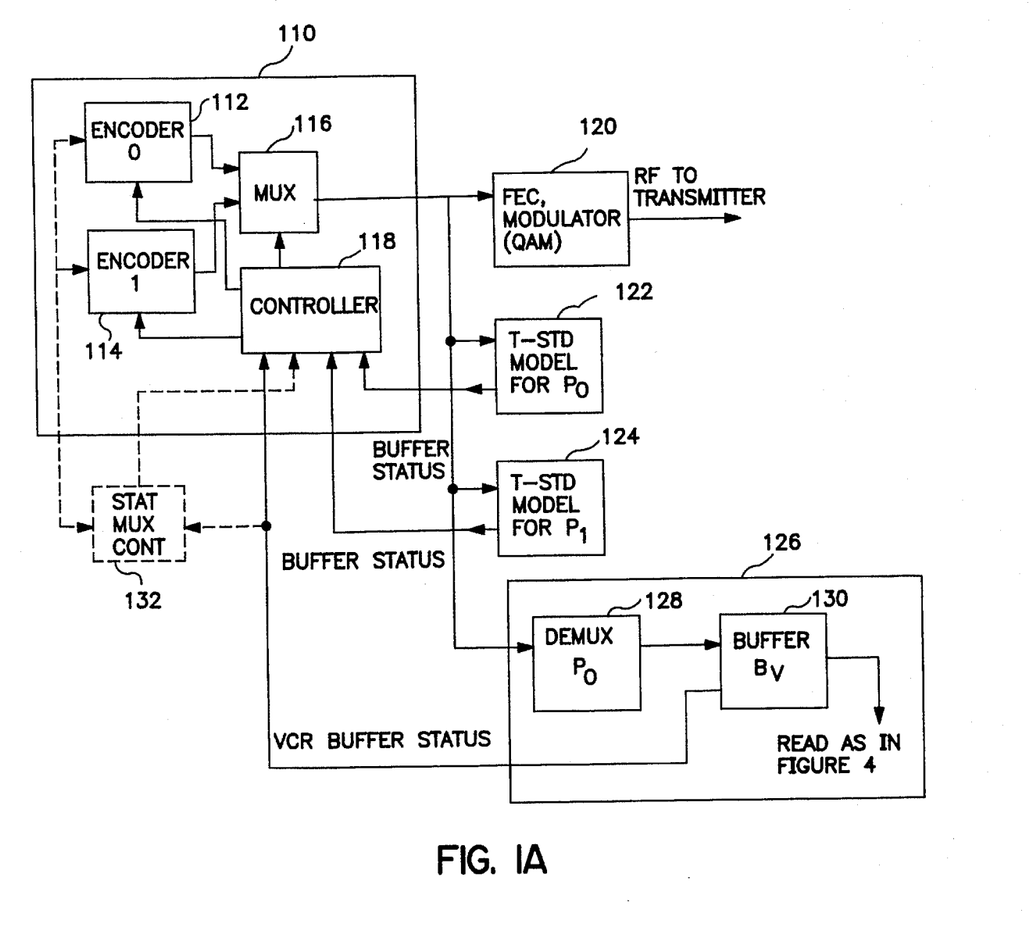
FIG. 1a is a block diagram of an MPEG-2 encoding system suitable for use with the present invention.

FIG. 1a is a block diagram of an MPEG encoder system according to the present invention. The system includes a conventional multi-program MPEG encoder 110 which contains two MPEG transport encoders 112 and 114.

Each of the encoders 112 and 114 provides fixed-length transport packets representing a single program MPEG transport stream to a respective input terminal of a multiplexer 116. The multiplexer 116 reformats and interleaves the transport packets for the individual single-program transport streams into a multi-program transport stream. This multi-program transport stream is passed to circuitry 120 which adds a forward error correction (FEC) code to each packet, converts the packets to digital code words and then modulates a carrier using quadrature amplitude modulation (QAM) to produce a radio frequency output signal.

The multiplexer 116 also applies the multi-program transport stream to two T-STD models, 122 and 124 and to a DVCR standard model 126. Each of the T-STD models controls the rate at which its respective program transport stream is inserted into the multi-program transport stream to ensure that the program can be decoded by a standard MPEG decoder. The DVCR standard model ensures, in addition, that the program transport stream P0 can be recorded on a digital video tape recorder according to the present invention.

Each of the models 122, 124 and 126 sends a buffer status signal to a controller 118 which is internal to the 110. The controller responds to these signals by changing the effective rate at which the respective program streams P0 and P1 appear in the output transport stream. The operation of the models 122 and 124 is described at section 2.4.2 of the above-referenced MPEG-2 system standard. Briefly, each of these models demultiplex transport packets for a respective one of the programs from the multi-program data stream. The demultiplexed packets are then applied to simulated first-in-first-out (FIFO) buffers having sizes defined by the above-referenced section. Data is written into the buffers as it is demultiplexed and read from the buffers at rates defined by the MPEG-2 system standard. According to this model, data does not leave the buffer at a steady rate but in bursts. For example, data representing a presentation unit and all of its stuffing bits is modeled as being read from the buffer in a single instant.

The simulated buffer has a high-water mark and a low-water mark. If the data stored in the buffer exceeds the high-water mark, the Buffer Status signal for the decoder signals the controller 118 to reduce the number of transport packets for that program in the multi-program transport stream. If, however, the amount of data in the buffer falls below the low-water mark, the T-STD model 122 or 124 signals the controller 118 to increase the number of transport packets applied to the multi-program transport stream.

The model 126 for the DVCR uses a simpler scheme. This model also defines a simulated demultiplexer 128 and buffer 130. According to this scheme, however, data is read from the simulated buffer at a fixed rate, simulating the rate at which the data would be written to the tape by the DVCR. The buffer 130 also has a high-water mark and a low-water mark. When the buffer 130 is filled above the high-water mark, the VCR buffer status signal causes the controller 118 to reduce the frequency at which packets for the program P0 are inserted into the multi-program transport stream. Conversely, when the amount of data in the buffer falls below the low-water mark, the controller 118 is conditioned to increase the frequency at which P0 transport packets are inserted into the multi-program transport stream.

The size of the simulated buffer 130 determines the limiting rates at which data for program P0 may be provided by the decoder 110. The model of the DVCR assumes that the buffer, which has a size of BVs bits, is read at a substantially constant rate of Rv2 bits per second, as long as there are bits to read. The model allows the buffer to underflow, assuming that the DVCR can insert packets containing stuffing bits onto the tape if this occurs. The data is written into the buffer in bursts which vary in duration, as it is demultiplexed from the multi-program transport stream. The rate at which the burst data is written is designated as Rb. Using these definitions, the buffer will be filled to capacity in Tb seconds as defined by equation (1).

$$Bvs=(Rb-Rv2)*Tb \qquad (1)$$

For a given encoder, the worst case for the burst rate, and burst duration are known. In addition, a standard rate may be defined for recording data on a DVTR. Using this information, the size, BVs, of the buffer 130 can be readily determined.

An encoder according to the present invention may also be used with a statistical multiplexer 132, as shown in phantom. As described in the above-referenced article by Guha et al., a statistical multiplexer allocates the resources available to the multiple programs (i.e. the channel bandwidth) among the resources in a manner that minimizes lost data. This algorithm may be used with the T-STD models to realize a more efficient multiplexing of the multi-program transport stream. The VCR buffer status signal is applied to the block 132 to act as an input signal to the rate scheduling algorithm of the controller 132 to further limit the data rate for the P0 program transport stream or to act as an override. As an override, the VCR buffer status signal limits the rate at which transport packets for the program P0 are provided by the multiplexer 116 irrespective of the desired rate calculated by the rate control circuitry of the controller 132. The output signal of the optional statistical multiplexer control circuitry 132 is applied to the multiplexer 118 as shown in phantom in FIG. 1a.

Although the demultiplexer 128 and buffer 130 are shown as actual devices, it is contemplated that these devices may be modeled in computer software, such that the standard DVCR model 126 is implemented as a microprocessor. In addition, the T-STD models 122 and 124 may also be implemented as simulations in a microprocessor or microcontroller. Indeed, it is contemplated that all of the models 122, 124 and 126 may be implemented in a single microprocessor and perhaps by a single integrated model. It is also contemplated that, depending on the signal to be recorded and the recording bandwidth of the digital VCR, the standard DVCR model may be subsumed in the T-STD model and may not be needed as a separate model.

Figure 1B:
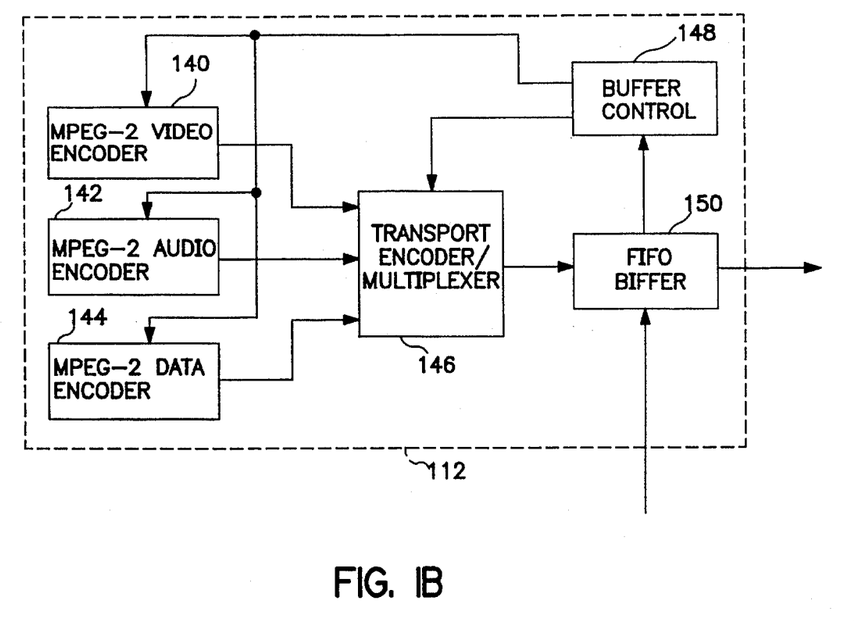
FIG. 1b is a block diagram of a transport encoder suitable for use in the encoding system shown in FIG. 1.

FIG. 1b is a block diagram which illustrates the construction of a typical encoder such as the P0 encoder 112 and P1 encoder 114. As shown in the Figure, each encoder includes three MPEG-1 or MPEG-2 elementary stream encoders, 140, 142 and 144. The encoder 142 is a MPEG video encoder which may be of the type described in U.S. Pat. No. 5,294,974 entitled HIGH DEFINITION VIDEO ENCODING SYSTEM HAVING COLOR-SENSITIVE QUANTIZATION, which is incorporated herein by reference for its teachings on MPEG video encoders. Encoder 142 may be a conventional MPEG audio encoder and encoder 144 may be a conventional MPEG data encoder.

The packetized elementary stream (PES) packets provided by the various decoders 140, 142 and 144 are applied to a transport encoder/multiplexer 146. The multiplexer 146 formats each of the PES packets into one or more transport packets, as defined in the MPEG-1 or MPEG-2 standard. These transport packets are then applied to a FIFO buffer 150. The fullness of this buffer is monitored by buffer control circuitry 148. If the number of transport packets in the buffer 150 exceeds a high-water mark, the buffer control circuitry 148 sends a signal to the encoders 140, 142 and 144 to decrease either the rate at which PES packets are provided or the size of each PES packet. If, the number of transport packets in the buffer 150 falls below a low-water mark, the controller 148 sends a signal to the encoders 140, 142 and 144 which causes the controllers to increase the rate at which PES packets are provided or to increase the size of a PES packet. If the effective data rate of the transport stream cannot be increased, the buffer control circuitry 148 conditions the transport encoder/multiplexer 146 to generate transport packets containing only stuffing bits.

Figure 2:
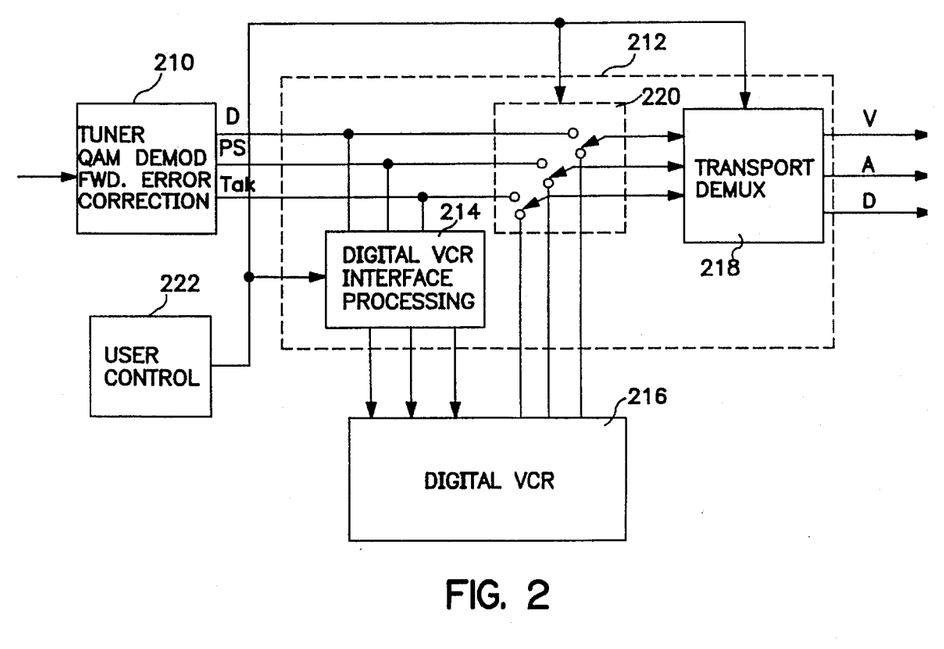
FIG. 2 is a block diagram of an MPEG-2 transport decoding and transport stream recording system suitable for use with the present invention.

Referring to FIG. 1a, once the multi-program transport stream has been generated by the multiplexer 116 it is formatted for transmission by the circuitry 120 and then transmitted to remote receivers. FIG. 2 is a block diagram which illustrates a receiver according to the present invention. The receiver includes a tuner, QAM demodulator and forward error correction code circuitry 210. This circuitry converts the radio-frequency signal provided by the encoder, shown in FIG. 1a, into a data stream D, a packet start signal, PS, and a byte clock signal, Tclk. These signals are applied to a digital VCR interface processor 214 (described below with reference to FIGS. 4a and 4b) and, via a switch 220, to a transport demultiplexer 218. The switch 220 is responsive to a signal provided by user control circuitry 222 to select either the input signal provided by the tuner 210 or the output signal of the digital VCR 216 to apply to the transport demultiplexer 218. The output signal of the transport demultiplexer is three PES packet streams, representing the video, audio and data portions of a selected program.

The user control 222 is also used by the processor 214 to select a particular program to be recorded by the digital VCR 216 and by the transport demultiplexer 218 to select a particular program to be demultiplexed from the transport stream and converted to PES packets by the transport demultiplexer 218.

FIGS. 3a, 3b, 3c and 3d are timing diagrams which illustrate the signal processing performed by the circuitry shown in FIG. 2 in receiving a multi-program transport stream, selecting a single program to be recorded, recording the selected program and playing back the recorded program.

Figures 3A, 3B, 3C, 3D:
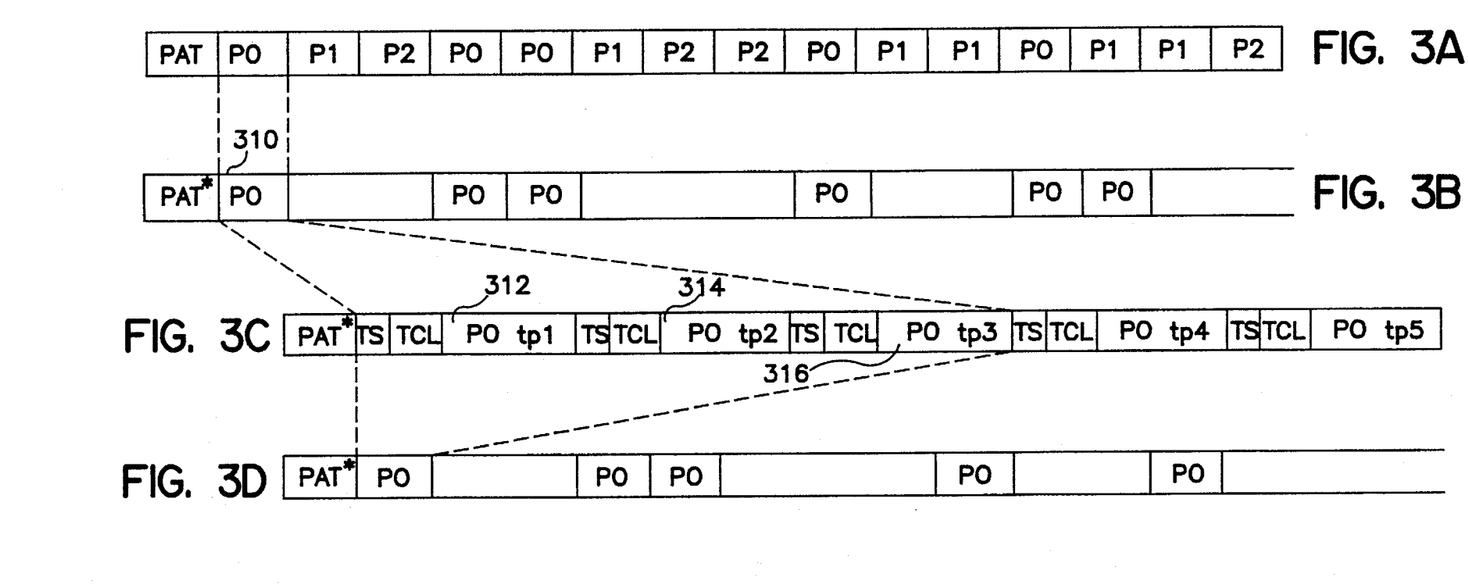
FIGS. 3a, 3b, 3c and 3d are timing diagrams which are useful for describing the operation of the present invention.

FIG. 3a shows a signal, D, representing the stream of bytes provided by the multi-program transport stream. The signal D is provided by the tuner, demodulation and error correction circuitry 210 of FIG. 2. The signal PS (not shown) is a signal which has a pulse coincident with the first byte of each transport packet in the signal D. The signal Tclk (not shown) is a clock signal in which each cycle corresponds to a respective byte of the signal D.

The signal D includes a transport packet which contains a program association table (PAT) and several transport packets for various program transport streams, P0, P1 and P2. Each of the blocks labeled P0, P1 and P2 may include multiple transport packets for the particular program transport stream. A typical transport stream would also include packets containing a program map table (PMT) and a Conditional Access Table(CAT), as well as null transport packets which are inserted when the bandwidth of the multi-program transport stream is less than the bandwidth of the channel through which it is being transmitted. For the sake of simplicity, these extra packets are not shown in FIGS. 3a through 3d.

In the exemplary scenario illustrated by FIG. 3b, program P0 is selected for recording. Responsive to this selection, the digital VCR interface processor 214 (shown in FIG. 2) produces the transport stream shown in FIG. 3b. This transport stream contains a modified version of the transport packet containing the PAT and the transport packets which are identified in the PAT as belonging to program P0. In addition, the data stream provided by the processor 214 includes CAT packets (not shown) which appear in the multi-program transport stream as well as PMT packets for program P0. The operation of the processor 214 is described in more detail below with reference to FIGS. 4a and 4b.

The single program transport stream produced by the processor 214 is applied to circuitry in the DVCR 216 which formats the transport stream for recording onto a digital video tape. This formatting is shown in FIG. 3c. As described above, each block labeled P0 in FIGS. 3a and 3b may include multiple transport packets for the program transport stream P0. This is illustrated in FIG. 3c, in which the P0 data stream 310 is shown as including the separate transport packets 312, 314 and 316 when it is recorded on the tape.

In order to recover the signals PS and Tclk, the data recorded on the tape also includes extra values, TS and TCL, for each transport packet. The value TS represents a time stamp which marks the occurrence of the signal PS and the value TCL represents the timing of the transport clock signal. The generation and use of these values is described below with reference to FIGS. 5 and 6.

FIG. 3d represents the signal which is recovered from the tape for display. This signal is generated from the data, shown in FIG. 3c, which is recorded on the tape, by circuitry such as that shown in FIG. 6, described below. Ideally, this signal matches the single program data stream which was applied to the DVTR 216 to be recorded. As described below with reference to FIG. 6, there may be slight differences between these signals. The inventor has determined that these differences are insignificant and should not affect the ability to decode or display the recorded image.

Figure 4A:
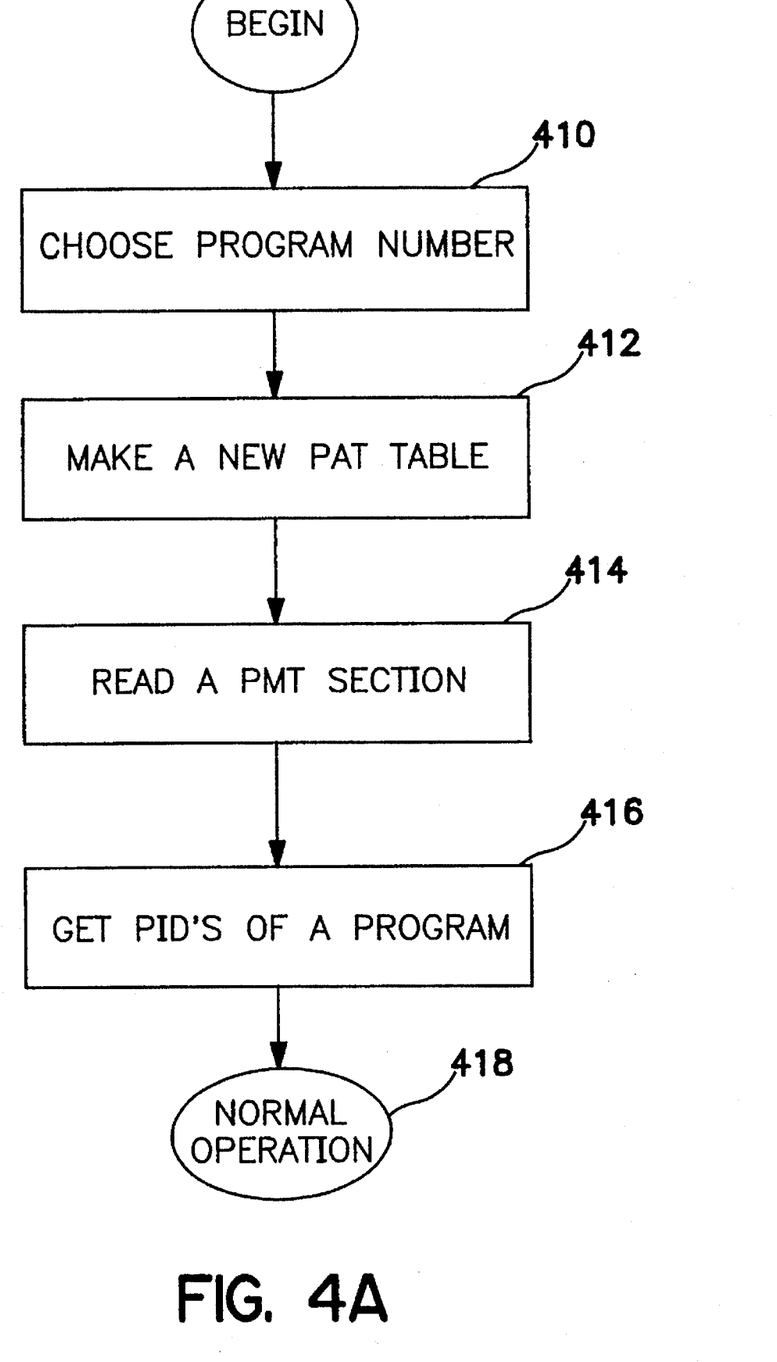
FIGS. 4a and 4b are flow-chart diagrams which are useful for describing the operation of the interface processing circuit shown in FIG. 2.
Figure 4B:
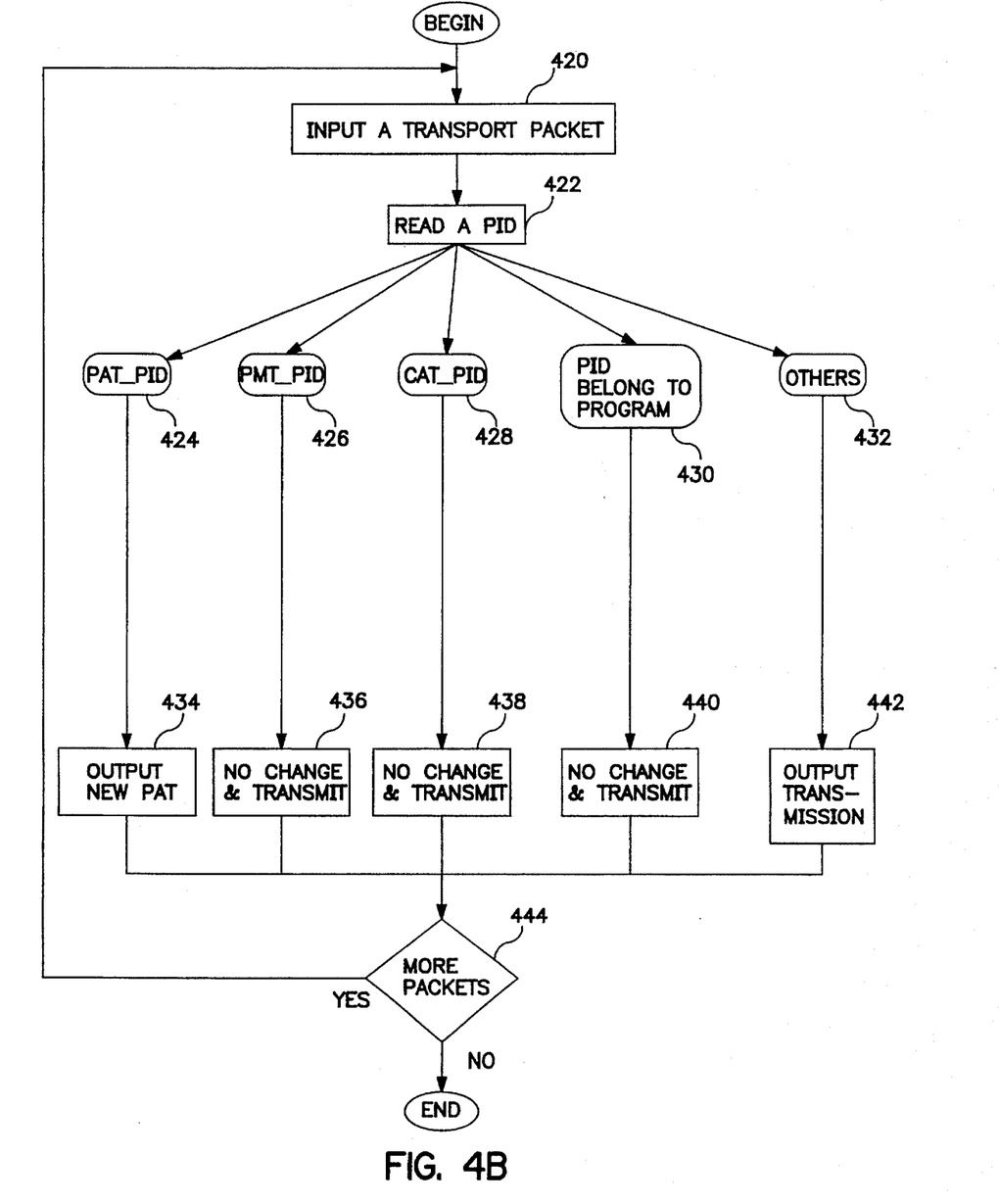

FIGS. 4a and 4b are flow-chart diagrams which illustrate the operation of the DVCR interface processor 214. This processor operates in two phases, an initialization phase (shown in FIG. 4a) when a program is selected from the multi-program transport stream and an operational phase (shown in FIG. 4b) when the program is being formatted for recording onto the tape.

As a first step in the initialization phase, a particular program is selected by using the user control 222 to indicate a specific program number. At step 412, the processor 214 processes the signal D provided by the circuitry 210 until it encounters a PAT packet. It retrieves this packet to locate and store the PMT_PID value for the selected program. This value identifies the packet identifier (PID) for the program map table (PMT) of the selected program. With this information, the processor 214 constructs PAT*, a program association table which describes a single-program transport stream that contains only the selected program, for example P0. An exemplary transport packet containing PAT* is shown in Table 1.

TABLE 1

| element | No. of Bits | Content |
| --- | --- | --- |
| sync byte | 8 | 0x47 |
| transport_error_indicator | 1 | "0" |
| payload_unit_start_indicator | 1 | "1" |
| transport_priority | 1 | "0" |
| PID | 13 | 0x000 |
| transport_scrambling_control | 2 | "00" |
| adaption_field_control | 2 | "01" |
| continuity_counter | 4 | Variable |
| pointer_field | 8 | 0x00 |
| table_id | 8 | 0x00 |
| section_syntax_indicator | 1 | "1" |
| '0' | 1 | "0" |
| reserved | 2 | "11" |
| section_length | 12 | 0x00D |
| transport_stream_id | 16 | 0x0000 |
| reserved | 2 | "11" |
| version_number | 5 | "00000" |
| current_next_indicator | 1 | "1" |
| section_number | 8 | 0x00 |
| last_section_number | 8 | 0x00 |
| program_number | 16 | selected program |
| reserved | 3 | "111" |
| program_map_PID | 13 | stored PMT_PID |
| CRC_32 | 32 | calculated CRC |

The remainder of the transport packet is filled with the stuffing byte 0xFF.

Essentially, this packet conforms to a default PAT having information only on the selected program, for example P0.

The meaning of each of the values is described in the above-referenced MPEG-2 systems specification at sections 2.4.3.2 through 2.4.3.3 and at sections 2.4.4.3 through 2.4.4.5.

The next step in the initialization process, step 414, reads the PMT indicated by the stored PMT-PID value. As described in the system specification, an individual PMT may span several transport packets. This PMT contains the elementary stream PIDs for all of the transport packets that are associated with the selected program. The processor 214 stores each of these PIDs at step 416. As the PIDs are being stored, at step 416 the processor 214 provides the packet containing the PAT* and the packet(s) containing the PMT to the DVCR 216. Next, the processor 214 switches to the normal operation process, shown in FIG. 4b.

The first step in the normal operation process is to receive a transport packet from the circuitry 210. At step 422, the PID of the transport packet is examined. If, at step 424, the PID indicates that the packet contains a PAT, at step 434, the stored PAT* is provided to the DVCR 216 in place of the PAT received in the signal D. If the PID indicates that the packet contains the PMT for the selected program (step 426), a CAT (step 428) or a PID belonging to the selected program (step 430), the packet is passed to the DVCR without modification via the respective steps 436, 438 and 440. If, however, at step 432, the PID indicates any other type of transport packet, the packet is ignored at step 442 and is not sent to the DVCR. After each packet is processed, step 444 is executed to determine if more packets are being provided by the circuitry 210. If so, then control returns to step 420 to process the next transport packet. Otherwise, the process ends.

In addition to this processing of the data stream, the processor 214 selectively passes the signals PS and Tclk to the DVTR only when it passes a transport packet at steps 434, 436, 438 and 440.

As described above, the data stream produced by the interface processor 214 is a single program transport stream such as that shown in FIG. 3b, a signal PS which has a pulse to indicate the start of a packet and a signal Tclk which has one clock pulse for each byte of each transport packet. These signals are applied to circuitry, shown in FIG. 5, in the DVCR 216 which converts the data stream shown in FIG. 3b into a data stream such as that shown in FIG. 3c.

Figure 5:
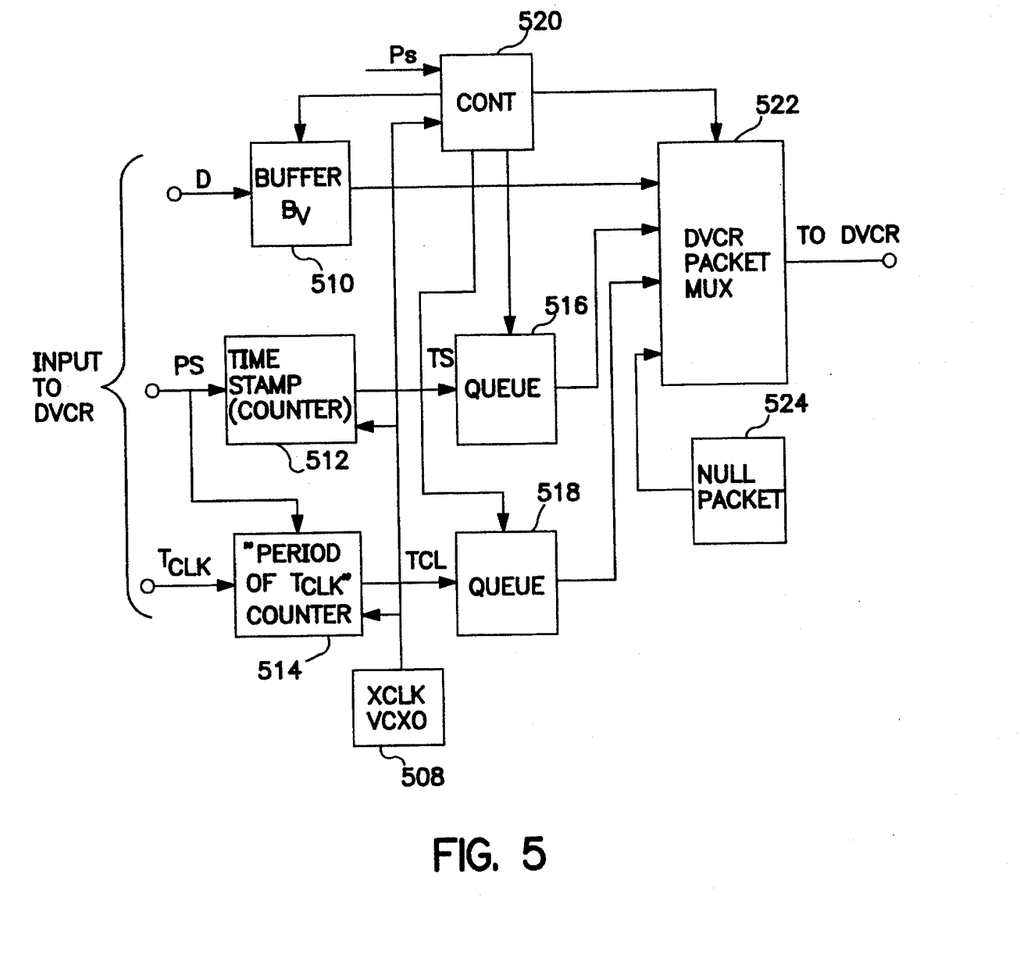
FIG. 5 is a block diagram of circuitry in the digital VCR shown in FIG. 2 which processes the transport stream that is to be recorded.

The circuitry shown in FIG. 5 employs a clock signal generator 508 which may, for example, be a voltage controlled oscillator that employs a resonant crystal. The generator 508 provides a clock signal, Xclk having a stable frequency that is relatively high compared to the transport packet byte clock signal, Tclk. If the bit-stream clock signal for the MPEG-2 encoded video signal is 24 MHz, the transport byte clock signal would be approximately 3 MHz. In this instance, the inventor has determined that a Xclk frequency of 50 MHz would be appropriate.

The data stream provided by the interface processor 214, shown in FIG. 2, is applied to a buffer memory 510. This buffer is the one that was modeled by the DVCR standard model 126, shown in FIG. 1. The buffer 510 is a FIFO buffer which is controlled by a controller 520 to store data from the processor 214 as it is received and to provide data to a DVCR packet multiplexer 522, as it is able to be recorded.

The packet start signal, PS, is applied to packet time stamp circuitry 512. The exemplary circuity 512 used in this embodiment employs a counter (not shown) which is clocked by the signal Xclk. Ideally, the counter would have a sufficient number of bits to count a number of cycles of the signal Xclk that occur during the longest program that can be taped. Assuming a maximum program length of four hours, and an Xclk frequency of 50 MHz, a 40-bit counter would be sufficient. The counter 512 is reset by the controller 520 when the system begins to tape a program. As each pulse of the signal PS is received, the instantaneous value of the counter, TS, is transferred to a FIFO memory 516. This value is a time-stamp representing an instant in time at which a packet of the single program transport stream was received by the DVCR.

The signal Tclk is applied to a counter 514 which is used to specify the frequency of the signal Tclk. The exemplary circuitry 514 actually includes two counters (not shown), a first one of the counters is clocked by the signal Tclk while the second counter is clocked by Xclk. Both counters are reset by a pulse of the signal PS. When the first counter has counted 188 bytes of a transport packet, it stops the second counter. The value in the second counter, TCL, represents a number of pulses of the signal Xclk that occurred during 188 pulses of the signal Tclk (i.e. the time to send one transport packet). This value is applied to a FIFO memory 518. When the data for a transport packet have been stored into the buffer 510, the value TS has been stored into memory 516 and the value TCL has been stored into the memory 518, the DVCR packet multiplexer 522 may transfer the packet to tape. As shown in FIG. 3c, the data for each transfer packet is preceded on the tape by the values TS and TCL that were calculated for the packet. Thus, when a packet is in the buffer Bv and is ready to be recorded on the tape, the multiplexer applies the values TS and TCL in sequence before the data bytes of the packet. If no packets are waiting to be recorded in the memories 520, 516 and 518, the multiplexer 522 is conditioned to place a null packet from the source 524 onto the tape. This packet is ignored during replay.

Figure 6:
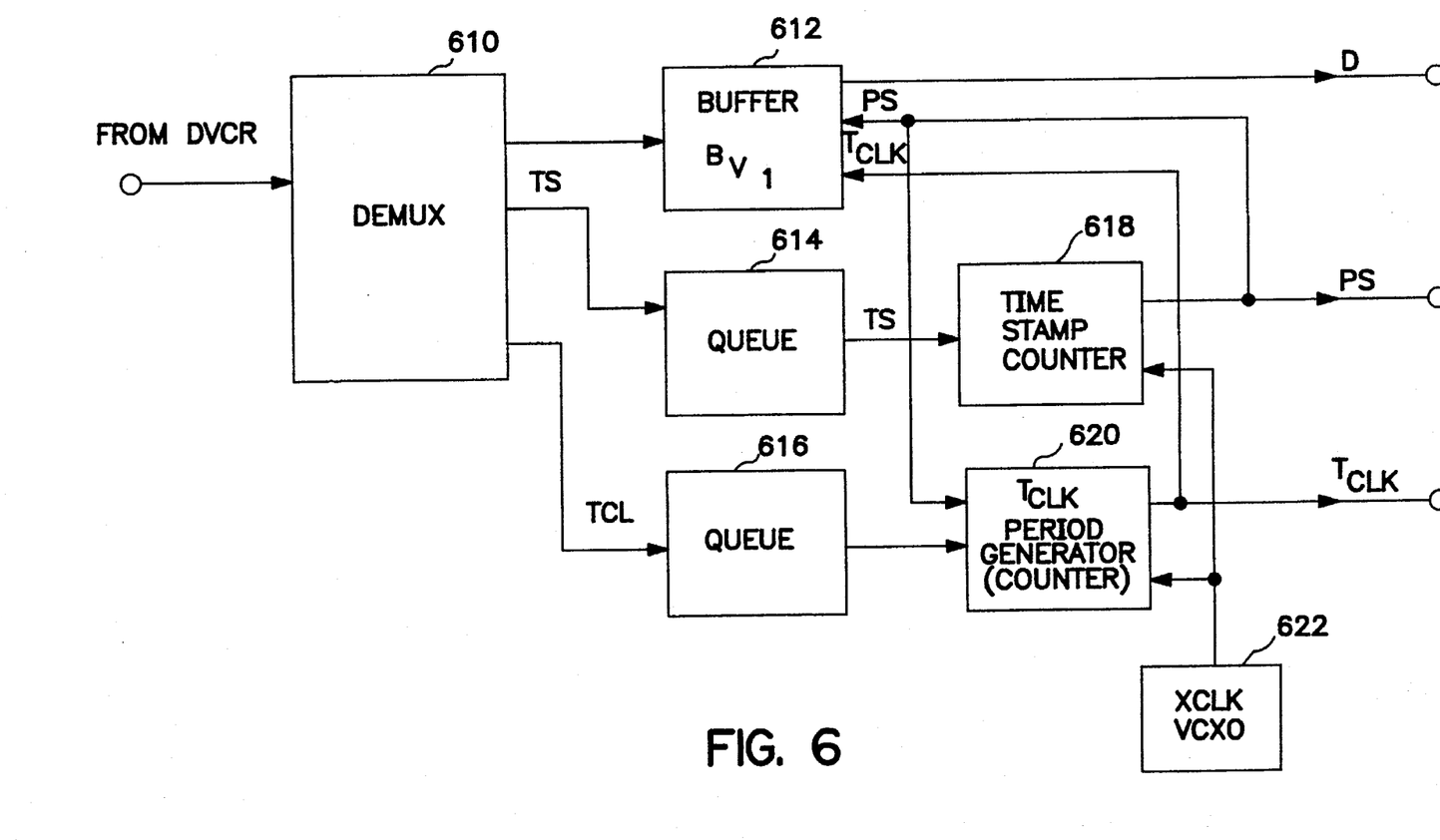
FIG. 6 is a block diagram of circuitry in the digital VCR shown in FIG. 2 which processes the transport stream that is recovered from the tape.

The data that was recorded on the tape is recovered and reformatted into a single program transport stream by circuitry such as that shown in FIG. 6. This circuitry includes a demultiplexer 610 which directs the values TS and TCL to respective FIFO memories 614 and 616 while directing the data bytes of a recorded transport packet to FIFO buffer memory 612. When data for a complete transport packet has been stored into the memories 612, 614 and 616, the data may be read out and reformatted into a transport packet to reconstruct a portion of the single-program transport stream. The values TS and TCL are applied, respectively, to a time-stamp counter 618 and a Tclk clock signal generator 620, respectively. Both of these elements are coupled to receive the signal Xclk.

The time stamp counter is reset when the first packet of data is available in the memories 612, 614 and 616. The recorded count value TS is compared to the counter value until a match is found. At that instant, the counter 618 generates a pulse signal which is provided as a signal PS'. The signal PS' is also applied to the buffer 612 to begin the transfer of the data bytes of the stored packet as a signal D'. The value TCL, representing the number of clock pulses of the signal Xclk which occurred during 188 periods of the signal Tclk, divided by 188 to produce value representing the average number of pulses of the signal Xclk which occurred during a single pulse of the signal Tclk. This value is applied to a frequency divider (not shown) which divides the signal Xclk in frequency to produce a signal Tclk' having approximately the same frequency as the signal Tclk. The frequency divider circuitry used in the clock generator 620 is reset by the signal PS' to select the proper phase of the signal Tclk'.

While the description set forth above relates to the recording of a single program from a multiple program transport stream, it is contemplated that the apparatus may be expanded to allow a more than one program from the multi-program transport stream to be recorded concurrently. This could be accomplished by modifying the DVTR interface circuitry 214 to accept more than one program number, to produce a modified PAT that contains entries for both programs and to recover PID values for all transport packets of all of the selected programs. These modifications would necessarily be accompanied by modifications to the standard DVTR model used in the transmitter to ensure that the data for the various programs are not provided at a rate higher than can be recorded by the multiple program recorder. This may be accomplished most easily by setting the standard sufficiently low to allow an inexpensive recorder to record one program, a more expensive recorder to record two programs, and so on.

Using the circuitry shown in FIG. 6, the signals D', PS' and Tclk', provided by the DVTR 216 (shown in FIG. 2) closely approximate equivalent signals which would be provided by the tuner, demodulator and error correction circuitry 210. The main difference between these signals is that the signals from the DVTR 216 represent a single program transport stream while the signals from the circuitry 210 represent a multi-program transport stream. In addition, there is a slight jitter in the timing of the signals PS', Tclk' and D' relative to the timing of the signals PS, Tclk and D. The inventors have determined that, with the use of a stable Xclk frequency that is much greater than the frequency of the signal Tclk, this jitter is not a serious problem.

As described above, the user control 222 determines whether the transport demultiplexer 218 receives signals from the DVTR 216 or from the circuitry 210. The user control 222 also determines which program is to be selected from the transport stream. When the signals are provided from the DVTR, however, the user control may not know the program number. If only one program has been recorded, the transport demultiplexer 218 may be conditioned to provide only that program as the output signal. If multiple programs have been recorded, however, the user control may allow the user to scroll among the programs using a program-up key and/or a program down key. If, however, program-guide information is transmitted in the multi-program transport stream, packets containing such information may be recorded on tape. During playback, the DVCR would use the guide to indicate which programs are being played back to the user.

Although the invention has been described in terms of an exemplary embodiment, it is contemplated that it may be practiced as described above within the spirit and scope of the appended claims.

The invention claimed is:

1. Apparatus for recording a program selected from a multi-program transport stream including a plurality of transport packets, the apparatus comprising:

means for receiving a user selection related to the selected program in the multi-program transport stream;

means, responsive to the received user selection, for processing and extracting transport packets corresponding to the selected program from the multi-program transport stream to provide a transport data stream for the selected program and for providing a timing signal containing timing information for each respective one of the transport packets in the transport stream representing the selected program;

means for encoding the timing information; and means for recording the encoded timing information with each respective packet of the transport data stream representing the selected program.

2. Apparatus according to claim 1, wherein:

the transport data stream includes a sequence of data bytes and the timing information includes 1) a packet start signal having a pulse to indicate a first byte for each respective transport packet in the transport data stream and 2) a packet clock signal having a nominal frequency such that there is one cycle of the packet clock signal for each byte in the transport data stream; and the means for encoding the timing information includes:

a source of system clock signal having a frequency which is greater than the nominal frequency of the packet clock signal;

time stamp generating means for counting pulses of the system clock signal to generate a sequence of time-stamp values representing instants at which respective pulses of the packet start signal occur; and clock count generating means for counting pulses of the system clock signal to generate a sequence of clock count values, each representing a respective number of pulses of the system clock signal which correspond to a predetermined number of pulses of the packet clock signal; and the means for recording the encoded timing information includes means for recording, in sequence, one of the time stamp values, a respective one of the clock count values and the data bytes representing a respective one of the transport packets.

3. Apparatus according to claim 2, further comprising:

play back means for recovering a single program transport stream from the data recorded on the tape, said play back means including:

means for storing the data bytes of the transport packets into a buffer as the data bytes are read from the tape;

a counter which counts pulses of the system clock signal to generate a reference count value;

means for comparing each of the time stamp values read from the tape, to the reference count value and to generate a pulse signal when the time stamp value matches the reference count value;

frequency dividing means for dividing the system clock signal, in frequency, by a value derived from the clock count values read from the tape, to produce a frequency divided clock signal; and means for fetching data values representing the data bytes of the transport packets from the buffer at instants determined by the pulse signal and the frequency divided clock signal.

4. Apparatus according to claim 3, wherein:

each of the transport packets includes N bytes of data, where N is an integer greater than 1;

the clock count generating means includes means for counting a number of pulses of the system clock signal occurring during N pulses of the packet clock signal; and the frequency dividing means includes means for dividing each of the clock count values by N to produce a sequence of quotient value and means for dividing the system clock signal, in frequency by the quotient value to produce the frequency divided clock signal.

5. Apparatus according to claim 3, wherein the multi-program transport stream is generated by an encoder and the encoder includes:

means for inserting packets of the selected program in the multi-program transport stream responsive to a control signal; and means for demultiplexing the packets of the selected program from the multi-program transport stream and for simulating the storing of the selected packets into the buffer and the fetching of the selected packets from the buffer to generate the control signal such that the selected packets are stored into the buffer at an average rate which does not exceed a rate at which the packets are fetched from the buffer.

6. Apparatus for recording a program selected from a multi-program transport stream including a plurality of transport packets, each transport packet containing a predetermined number of digital bytes of data, the apparatus comprising:

means for receiving a user selection related to the selected program in the multi-program transport stream;

means, responsive to the received user selection, for processing and extracting transport packets corresponding to the selected program from the multi-program transport stream to provide a transport data stream representing the selected program;

means, responsive to the transport data stream, for generating a first timing signal having pulses coincident with the first byte of each transport packet;

means for generating a second timing signal having pulses coincident with each byte of each transport packet;

means for generating first successive digital values representing respective time stamps for each pulse of the first timing signal;

means for generating second successive digital values representing an average frequency of the second timing signal; and means for recording, in succession, one of the first successive digital values, a corresponding one of the second successive digital values and the predetermined number of digital bytes of a corresponding one of the transport packets.

7. Apparatus according to claim 6, further comprising:

play back means for recovering a single program transport stream from the data recorded on the tape, said play back means including:

means for storing the predetermined number of data bytes of the transport packet into a buffer as the data bytes are read from the tape and for providing the corresponding first and second recorded digital values;

a counter which counts pulses of the system clock signal to generate a reference count value;

means for comparing the first recorded digital value to the reference count value to generate a pulse signal when the first recorded digital value matches the reference count value;

means for dividing the system clock signal, in frequency, by a value derived from the second recorded digital value to produce a frequency divided clock signal; and means for fetching a first one of the data bytes from the buffer at an instant determined by the pulse signal and for fetching each of the other ones of the predetermined number of data bytes at instants determined by the frequency divided clock signal.

8. Apparatus according to claim 7, wherein the multi-program transport stream is generated by an encoder and the encoder includes:

means for inserting data bytes representing packets of the selected program in the multi-program transport stream responsive to a control signal; and means for demultiplexing the data bytes representing packets of the selected program from the multi-program transport stream and for simulating: 1) the storing of the demultiplexed data bytes into the buffer and 2) the fetching of the selected packets from the buffer to generate the control signal such that the selected packets are stored into the buffer at an average rate which does not exceed a rate at which the packets are fetched from the buffer.

9. A method for recording a program selected from a multi-program transport stream including a plurality of transport packets, the method comprising the steps of:

receiving a user selection related to the selected program in the multi-program transport stream;

processing and extracting, responsive to the received user selection, transport packets corresponding to the selected program from the multi-program transport stream to provide a transport data stream for the selected program and for providing a timing signal containing timing information for each respective one of the transport packets in the transport stream representing the selected program;

encoding the timing information; and recording the encoded timing information with each respective packet of the transport data stream representing the selected program.

* * * * *